Nov. 8, 1955 E. C. GIBSON ET AL 2,722,983
STOPPING DEVICE FOR STAPLE FIBER CUTTER
Filed Nov. 14, 1951
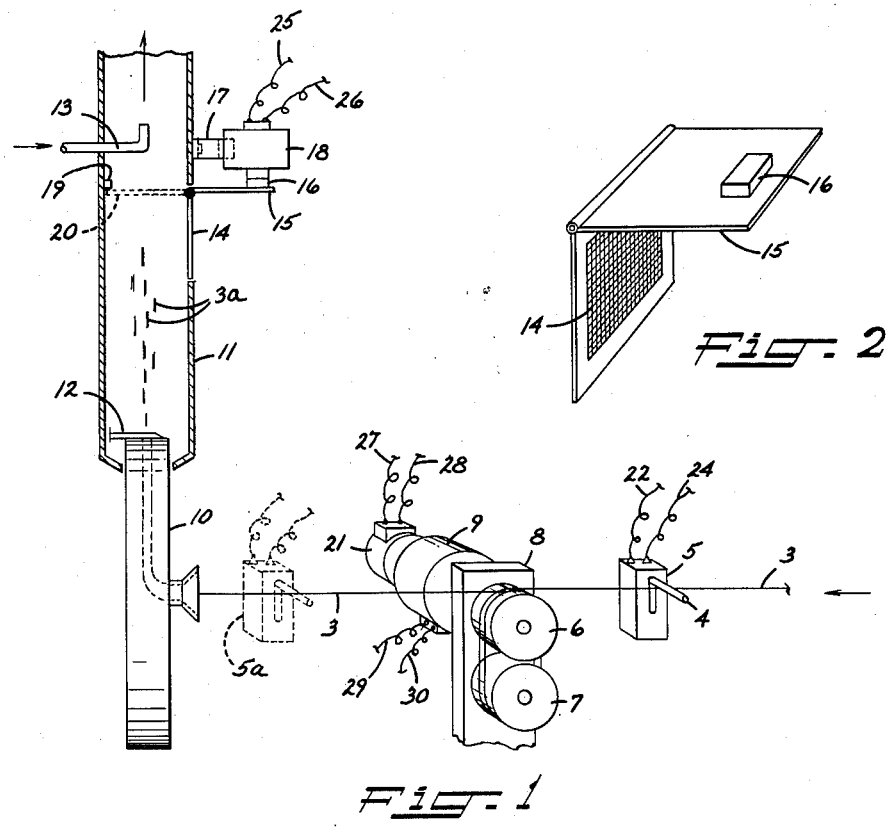
Fig. 1
Fig. 2
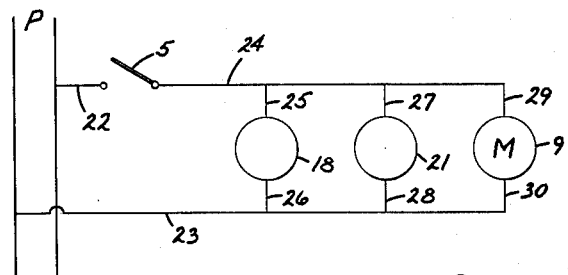
Fig. 3
INVENTORS.
EUGENE C. GIBSON
LAWRENCE C. HOLT
BY
ATTORNEY.

United States Patent Office 2,722,983
Patented Nov. 8, 1955

2,722,983

STOPPING DEVICE FOR STAPLE FIBER CUTTER

Eugene C. Gibson, Havertown, Pa., and Lawrence C. Holt, Wilmington, Del., assignors, by direct and mesne assignments, to The Chemstrand Corporation, Wilmington, Del. and Philadelphia, Pa., a corporation of Delaware Application November 14, 1951, Serial No. 256,345

7 Claims. (Cl. 164—39)

This invention relates to a stopping device for staple fiber cutter. More particularly the invention is concerned with an automatic stopping device to be employed in connection with a staple fiber cutter. For example, a staple fiber cutter, such as a rotary staple fiber cutter of the Beria type, and the like.

While the present invention is applicable to being employed with various types of apparatus designed for cutting a strand, thread, yarn, monofilament, roving, sliver, tow, bundle of fibers and/or filaments, rod, wire, and the like, whether formed from natural, artificial, cellulosic, or synthetic materials, into short lengths or fibers, for simplicity of description, the present invention will be described as it is applicable to cutting a strand, roving, or tow, formed from continuous filaments of synthetic materials, into staple fibers, it being understood, of course, that this is merely intended in an illustrative sense and the invention is not to be limited thereby, but only insofar as the same may be limited by the appended claims. Further, "strand," as used throughout the specification and claims, is intended to include a thread, yarn, monofilament, roving, sliver, tow, bundle of fibers and/or filaments, rod, wire, and the like, etc., whether formed from natural, artificial, cellulosic, or synthetic materials, for example, cotton, flax, hemp, casein, alginates, etc., regenerated cellulose, such as formed from viscose, cuprammonium cellulose, etc., cellulose esters, such as cellulose acetate, nitrocellulose, cellulose propionate, etc., mixed cellulose esters, cellulose ethers, such as methyl cellulose, ethyl cellulose, benzyl cellulose, hydroxyethyl cellulose, carboxymethyl cellulose, etc., polymers and copolymers of acrylonitrile, vinyl acetate, vinyl chloride, methyl methacrylate, vinylidene chloride, polyvinyl alcohol, polyvinyl acetate, polyamides, urea-formaldehyde, phenol-formaldehyde, and the like, etc., as well as fiber forming monomeric resinous materials and the like.

Generally when cutting a strand or a continuous length of filaments into staple fibers, the strand is fed into an opening of a rotating disc coincident with the axis thereof, and is fed radially outward through an opening or channel in the disc. As the strand projects a certain distance from the periphery of the disc it is cut or sheared off by a knife thus forming staple fibers.

The length of the fibers depends upon the speed of rotation of the disc and the speed with which the strand is fed to the disc. Very often it is necessary that all the fibers so cut be of equal length. This necessitates synchronizing the speed of the disc with the speed of the feed rollers feeding the strand to the disc. However, when the strand breaks it will not be fed at the same rate of speed due to loss of tension on the strand and in addition, should the feed rollers on the feeding means be braked, a certain length of strand will be fed to the rotary cutter at a reduced rate of speed while the feed rollers are coming to a complete stop. This results in a certain number of staple fibers being cut which are not of the desired length and which may ruin a whole batch of staple fibers. It is therefore desirous to have some means for stopping the feeding rollers immediately upon a break in the strand or upon a too great reduction in the tension of the advancing strand while at the same time preventing the passage of staple fibers of uneven lengths into the batch or supply of staple fibers previously cut.

It is a general object of the present invention to provide an apparatus for cutting a strand or bundle of filaments into staple fibers comprising means for automatically stopping the feeding of the strand immediately upon a break in the strand or a reduction in tension thereof beyond a certain predetermined point while at the same time automatically preventing the passage of staple fibers of irregular length into the system or collection of staple fibers previously cut.

It is a specific object of the invention to provide a switch-operated electromagnetic means for simultaneously stopping the strand-feeding means, and preventing the staple fibers from entering the system.

It is another specific object of the invention to provide an electromagnetic stopping device which is strand actuated.

Other objects and advantages of the present invention will be apparent from the description thereof hereinafter.

In general, the objects of the present invention are accomplished by passing the strand in contact with a drop-switch and then to suitable feed rollers, or the like, such as feed godets, etc. Any suitable strand-feeding means may be employed, however. The strand is then fed into a cutting mechanism, such as a rotary cutter of the Beria type. The cutter is so arranged that the fibers are cut in a conduit having a vacuum therein or a compressed air line therein directed away from the cutter in order to convey the cut staple fibers to a dryer, storage bin, or any other place or point of use as desired.

Means are pivotally mounted in the conduit for preventing the passage of staple fibers therethrough. Attached to said means is an electromagnet which is connected in parallel with a drive motor and an electromagnetic brake on the drive-shaft of the motor of the strand-feeding mechanism. The drop-switch is connected in series with the motor, electromagnet, and electromagnetic brake. When the strand breaks, the switch is actuated breaking the circuit causing the drive motor to stop and applying the electromagnetic brake to the shaft thereof, while at the same time the electromagnet is deenergized allowing the pivotally mounted means to rotate and block the passage of staple fibers through the conduit.

In order that the following detailed description of the present invention may be clearly understood, reference is to be had to the accompanying drawing illustrating a practical embodiment of the invention, it being understood that this is in no way intended in a limitative sense.

In the drawing,

Figure 1 is a diagrammatic side elevation view of a preferred embodiment of the invention, Figure 2 is a perspective view of the staple fiber collecting screen employed in the staple fiber removal conduit, and Figure 3 is a diagrammatic view of the electrical connections employed in the embodiment shown in Figure 1.

Referring to all the figures of the drawing, a strand 3, which may be wet or dry, crimped or uncrimped, is led under the lever 4 of the drop-switch 5. The lever is thus held up while the strand is passing thereunder closing the switch 5 and completing the circuit to the drive motor, electromagnetic brake and electromagnet, hereinafter described.

The strand 3 then passes around the feed godets 6 and 7 mounted on the frame 8 and driven by motor 9. There may be one or more courses of the strand around the godets as desired, depending upon the size of the strand, the speed of rotation of the godets, etc. The strand 3, then passes into the rotary cutter 10, which is preferably of the Beria type as shown, although any other suitable cutting device may be employed, if desired.

A conduit 11 is positioned above the cutter 10 and the cutter extends upwardly therein with the knife-blade 12 of the cutter 10 being positioned in the conduit 11. It is to be understood, of course, that the conduit 11 may be positioned below the cutter or alternatively, the cutter 10 and conduit 11 may be disposed in a horizontal position with the strand 3 entering the cutter along a vertical path.

The cut staple fibers 3a pass upwardly through conduit 11 to a drier, or storage compartment, or any other point of use, as desired, by reason of a vacuum in conduit 11 created by any suitable means, not shown. If desired, a compressed air line 13 may be positioned in conduit 11 in place of the vacuum to carry the staple fibers 3a therethrough.

Pivotally mounted in conduit 11 is a screen 14 (see Figure 2). Integrally or rigidly attached to the screen 14 and extending outwardly at right angles thereto, is a plate-like member 15 which may be made of metal, wood, plastic, or any other suitable rigid material, and the like. Fastened to the outer face of member 15 is a metal block or projection 16.

Attached to the side of conduit 11 by means of bracket 17, is an electromagnet 18. When the apparatus is in operation the electromagnet 18 is energized. The member 15 is swung up so that block 16 contacts the energized electromagnet and the screen 14 is thus held in the position shown in Figure 1. When the electromagnet 18 is deenergized, due to the opening of switch 5 upon a break in strand 3, the screen 14 is rotated to the dotted line position 20 up against the stop 19 attached to the inner surface of conduit 11, by reason of the weight of block 16 on member 15 and also the vacuum in conduit 11. Thus the fibers 3a are collected on screen 14.

Fastened to the drive shaft of motor 9 is an electromagnetic brake 21, of conventional design. When the brake 21 is energized the shaft of motor 9 is free to rotate and when switch 5 is opened, due to a break in strand 3, the brake 21 is applied and simultaneously the motor 9 is stopped, thus stopping the rotation of feed godets 6 and 7.

Referring to the electrical diagram shown in Figure 3, there is a power source P having lead lines or conductors 22 and 23 attached thereto. Line 22 is connected to one side of switch 5 and conductor 24 is attached to the other side of switch 5. A conductor 25 is attached between the electromagnet 18 and conductor 24 and a conductor 26 is attached between the electromagnet 18 and conductor 23. Conductors 27 and 28 are attached between the electromagnetic brake 21 and conductors 24 and 23 respectively. Conductors 29 and 30 are connected between motor 9 and conductors 24 and 23 respectively.

While only one switch 5 has been shown, it is preferable in many instances to employ a second switch 5a (shown in dotted lines in Figure 1), similar to switch 5 and connected in series therewith, between the feed godets 6 and 7 and the cutter 10. The purpose of switch 5a is to take care of any break in strand 3 which may occur between the feed godets or other suitable feeding device and the cutter. In addition the strand 3 may be passed through any of the known and conventional tensioning devices prior to passing under lever 4 of switch 5. A tensioning device may be necessary in some instances to insure that strand 3 closes switch 5 by lifting lever 4, the latter being spring-actuated to open position.

The operation of the present invention is as follows: When a break occurs in strand 3 or the tension thereof is reduced to such a point that lever 4 drops sufficiently to open switch 5, the motor 9 is stopped, the electromagnetic brake 21 is applied to the drive shaft of motor 9, and the electromagnet 18 is deenergized allowing the screen 14 to swing to the dotted line position 20 shown in Figure 1. All these operations take place simultaneously and staple fibers of uneven length are collected on screen 14. When the strand 3 is again threaded through the apparatus and switch 5 is closed, the screen 14 is again in the position shown in Figure 1 and the staple fibers collected thereon can be removed therefrom by hand or any other suitable means. If desired, the screen 14 may be replaced by a solid plate which would act as a shunting device by being so positioned as to direct the fibers to a suitable waste container.

The present invention has many advantages among a few of which may be mentioned the fact that the device is simple in construction and provides a quick and efficient means for stopping the feeding of a strand to a staple fiber cutter while at the same time preventing the entrance into the system of staple fibers of uneven and undesirable lengths. The present invention has proved to be particularly useful in forming crimped staple fibers from a crimped tow, in turn formed from acrylonitrile polymers and copolymers. Numerous other advantages of the present invention will be apparent to those skilled in the art.

It is to be understood that changes and variations may be made without departing from the spirit and scope of the invention as defined in the appended claims.

We claim,

1. In combination, a device for cutting a continuous strand into staple fibers comprising, a rotary cutting means comprising a rotatable member having an axial passage therein to receive the strand to be cut, a radial passage therein communicating with said axial passage for discharging the strand therefrom, a stationary cutting blade mounted adjacent the periphery of the rotatable member so as to cut the strand emerging from the radial passage, strand feeding means positioned along the path of the strand preceding the cutting means so as to feed the strand to the axial passage, braking means attached to said feeding means, conduit means mounted so that one end thereof encloses a portion of the rotatable member and the cutting blade, pneumatic means mounted in said conduit means for passing the staple fibers therethrough, a staple fiber collecting means for preventing the passage of staple fibers through the conduit means movably mounted in said conduit means so as to be capable of being moved into and out of collecting position, electromagnetic means attached to the conduit means in a position capable of moving the collecting means into and out of collecting position in said conduit means, strand-actuated switch means positioned adjacent the strand-feeding means and in contact with the strand being fed to the cutting means, and an electric circuit connecting the switch means, feeding means, braking means, and electromagnetic means, said circuit being closed when the switch means contacts the feeding strand, and said circuit being broken when the tension of the strand is reduced causing the feeding means to be stopped, the braking means to be applied to the feeding means, and the electromagnetic means to be deenergized causing the collecting means to move into collecting position, all of said operations taking place sequentially and simultaneously upon a break in the circuit.

2. A device for cutting a continuous strand into staple fibers as defined in claim 1 wherein the braking means is an electromagnetic brake.

3. A device for cutting a continuous strand into staple fibers as defined in claim 1 wherein the staple fiber collecting means comprises a screen forming part of the wall of the conduit means, said screen having a plate-like member attached at right angles thereto, a metal block attached to one surface of the plate-like member positioned to contact the electromagnetic means when the latter is energized, said screen and member being pivotally mounted in the wall of the conduit means so that when the screen is blocking the passage in the conduit means the member forms part of the wall of the conduit means in a position formerly occupied by the screen.

4. A device for cutting a continuous strand into staple fibers as defined in claim 1 wherein the electric circuit connects the feeding means, braking means, and electromagnetic means in parallel, and connects the switch means in series with the said feeding, braking and electromagnetic means.

5. A device for cutting a continuous strand into staple fibers comprising, a rotary cutting means comprising a rotatable member having an axial passage therein to receive the strand to be cut, a radial passage therein communicating with said axial passage for discharging the strand therefrom, a stationary cutting blade mounted adjacent the periphery of the rotatable member so as to cut the strand emerging from the radial passage, strand feeding means positioned along the path of the strand to the axial passage, an electromagnetic brake mounted on said feeding means and in non-braking position when the electromagnetic brake is energized, conduit means mounted so that one end thereof encloses a portion of the rotatable member and the cutting blade, pneumatic means mounted in said conduit means for passing the staple fibers therethrough, staple fiber-collecting means for preventing the passage of staple fibers through the conduit means movably mounted in said conduit means so as to be capable of being moved into and out of collecting position, electromagnetic means attached to the outer wall of the conduit means in a position capable of moving the collecting means into and out of collecting position in said conduit means, said collecting means comprising a screen forming part of the wall of the conduit means, said screen having a plate-like member attached at right angles thereto, a metal block attached to one surface of the plate-like member positioned to contact the electromagnetic means when the latter is energized, said screen and member being pivotally mounted in the wall of the conduit means such that when the screen is blocking the passage in the conduit means the member forms part of the wall of the conduit means in a position formerly occupied by the screen, strand-actuated switch means positioned adjacent the strand-feeding means and in contact with the strand being fed to the cutting means, and an electric circuit connecting the switch means, feeding means, electromagnetic brake, and the electromagnetic means, said circuit being closed when the switch means contacts the feeding strand, and said circuit being broken when the tension of the strand is reduced, causing the feeding means to be stopped, the electromagnetic brake to be deenergized allowing the brake to be applied to the feeding means, and the electromagnetic means to be deenergized causing the collecting means to pivot into collecting position, all of said operations taking place sequentially and simultaneously upon a break in the circuit.

6. A device for cutting a continuous strand into staple fibers as defined in claim 5 wherein there is a strand-actuated switch adjacent the path of travel of the strand and preceding the feeding means along the path and a second strand-actuated switch adjacent the path of the strand and following the feeding means along the path.

7. A device for cutting a continuous strand into staple fibers as defined in claim 1 wherein there is a strand-actuated switch adjacent the path of travel of the strand and preceding the feeding means along the path and a second strand-actuated switch adjacent the path of the strand and following the feeding means along the path.

References Cited in the file of this patent

UNITED STATES PATENTS

| | | |
|---|---|---|
| 1,060,384 | Valentine | Apr. 29, 1913 |
| 1,999,618 | Raymond | Apr. 30, 1935 |
| 2,179,517 | Pelosi | Nov. 14, 1939 |
| 2,201,180 | Jordan | May 21, 1940 |
| 2,323,644 | Castellan | July 6, 1943 |
| 2,418,125 | Koster et al. | Apr. 1, 1947 |
| 2,447,976 | Curtis | Aug. 24, 1948 |

FOREIGN PATENTS

| | | |
|---|---|---|
| 705,795 | Germany | May 9, 1941 |